April 12, 1955   H. F. BELDING   2,706,057
LIFT TRUCK
Filed Aug. 21, 1953

INVENTOR.
Howard F. Belding
BY
ATTORNEYS.

United States Patent Office 2,706,057
Patented Apr. 12, 1955

2,706,057

LIFT TRUCK

Howard F. Belding, Camarillo, Calif.

Application August 21, 1953, Serial No. 375,842

1 Claim. (Cl. 214—392)

(Granted under Title 35, U. S. Code (1952), sec. 266)

The invention described herein may be manufactured and used by or for the Government of the United States of America for govermental purposes without the payment of any royalties thereon or therefor.

This invention relates to a lift truck of the type designed to straddle a load, raise it clear of the floor, and move it to a new location for unloading.

An object of the invention is to provide a truck of the type indicated, which will be simple and economical in operation, so as to make it suitable for situations where the truck is used only occasionally and for situations where the cost of the usual lift truck would be prohibitive.

To this end, the truck of the present invention is made of simple and cheap structural members which may be shipped in knocked-down form and assembled at the point of use; and the truck is preferably without motor, being operated manually both in hoisting its load and in propelling it over the floor or platform.

Other objects and many of the attendant advantages of this invention will be readily appreciated as the same becomes better understood by reference to the following description.

Figure 1:
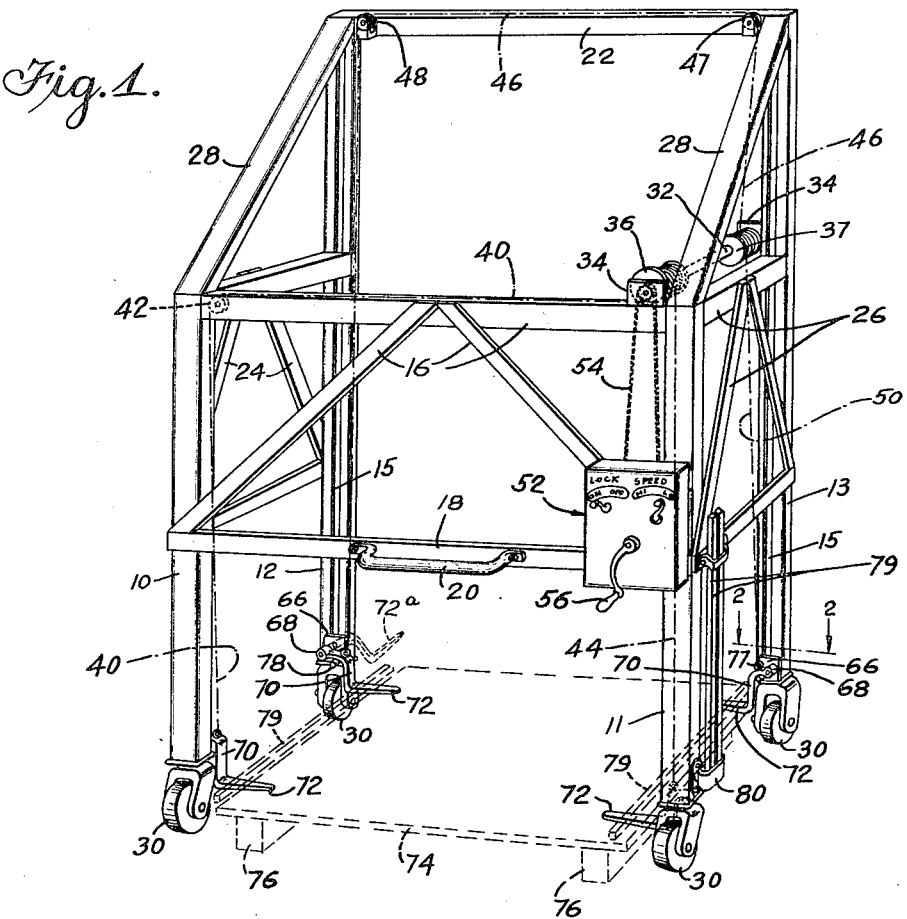
Figure 2:
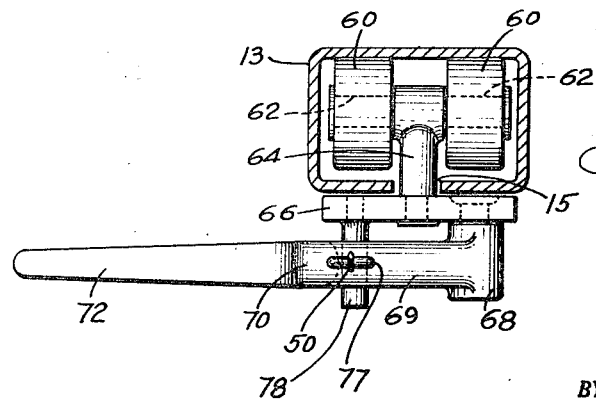

Fig. 1 is a perspective view from the rear of a truck embodying the invention; and Fig. 2 is an enlarged horizontal sectional view taken on the line 2—2 of Fig. 1.

The truck shown in the drawing comprises four hollow upright legs 10, 11, 12, 13, each preferably formed of structural steel members having the cross-sectional form indicated in Fig. 2, with a longitudinal slot 15 which in the case of the forward legs 12, 13 faces rearwardly, and in the case of the rear legs 10, 11 faces forwardly.

The rear legs are secured together by suitable braces 16 and by a crossbar 18 mounted at convenient height and provided with a handle 20 whereby the vehicle may be drawn or pushed over the floor. The forward legs are longer and are secured to each other by a truss or cross-piece 22 which is mounted at such height as to clear a load which has been elevated by the truck to its highest position.

The two pairs of legs are secured together by suitable bracing 24 and 26. Inclined braces 28 connect the tops of the rear legs with the tops of the forward legs. Casters 30 are mounted in the legs to facilitate movement of the vehicle.

A shaft 32 is rotatably mounted in brackets 34 secured to the frame members, and carries two reels 36, 37. A cable 40 extends from reel 36 over a pulley 42 and is secured to a dolly or hoisting unit, described hereinafter, associated with leg 10. A cable 44 extends from reel 36 directly to another hoisting unit associated with leg 11. A similar cable 46 extends from reel 37 over pulleys 47, 48 on cross-piece 22 and thence to a hoisting unit on leg 12, while another cable 50 extends directly to a hoisting unit on leg 13.

The shaft 32 and its reels are manually rotated by any suitable means such as the mechanism indicated by the control casing 52 which is connected to the shaft by a chain 54 and manually actuated by means of a crank 56. Suitable lock and release mechanisms may be employed, as well as a change-speed device, as indicated in the drawing.

Details of a hoisting unit are shown in Fig. 2. It comprises two rollers 60 rotatable on a common axle 62 and designed to roll on the inner surfaces of leg 13 with sufficient clearance in the horizontal plane to avoid binding. Fixed to the axle 62 is an arm 64 having at its outer end a plate 66 designed to slide along the outer surface of leg 13, with ample clearance. Pivoted to plate 66 is a stud 68 to which is fixed a lever formed with an inwardly extending portion 69, a downwardly extending portion 70, and an inwardly extending portion 72 forming a tine which is designed to fit under a pallet such as is indicated at 74, having cleats 76 which normally support it a few inches above the floor. The portion 69 is provided, inwardly of stud 68, with an eyelet 77 to which the cable 50 is secured. In order to limit the rotation of the lever in the downward direction, a stop in the form of a stud 78 is fixed to the plate 66 and extends beneath portion 69 in such relation that the tine 72 cannot incline inwardly beyond its horizontal load-supporting position.

In operation, the truck is wheeled to a position where it straddles the pallet to be moved. The levers 70, 72 may be in their lowermost position, wherein the tines 72 are below the level of the pallet; or, if they are in raised position, they may be lowered by means of handle 56, causing them to move downwardly by their own weight while permitting them to tilt upwardly and outwardly to clear the pallet and load, as indicated at 72a in Fig. 1, after which they resume their normal attitude, shown in solid lines. If desired, rods 79 may be laid upon the tines 72, to distribute the loading more evenly and to enable the truck to handle pallets whose length is less than the distance between the forward and the rear tines 72. Such rods when not in use may be carried in brackets 80. Crank 56 is then rotated to apply tension to the cables 40, 44, 46, 50 and thereby raise tines 72 or rods 79 into contact with the undersurface of the pallet. Further rotation of crank 56 will cause the tines to raise the pallet to the desired height, whereupon the truck is wheeled to the desired position, which may be a position wherein it straddles a stack of other pallets. The crank 56 is then rotated in the opposite direction to deposit the pallet 74 upon the stack. Removal of a pallet from the top of a stack and depositing it on the floor is accomplished by the same steps in reverse order.

For some installations it may be desirable to equip the truck with propelling means such as an electric motor and drive wheels of known type. It will be apparent that the reel and cable hoisting means shown may be replaced by hydraulic jacks mounted on the several legs and actuated by the same motor.

Obviously many modifications and variations of the present invention are possible in the light of the above teachings. It is therefore to be understood that within the scope of the appended claim the invention may be practiced otherwise than as specifically described.

What is claimed is:

A straddle truck comprising a pair of parallel frames, each comprising hollow slotted vertical legs, casters supporting said frames for rolling movement, a cross frame connecting said parallel frames and providing clearance to permit the frame to straddle a pile of material, dollies vertically movable within said legs, a reel on said cross frame, means for rotating said reel, flexible tension members connecting said reel to said dollies for simultaneously moving said dollies vertically of said legs, and a plurality of material-supporting members each pivotally related to one of said dollies and extending inwardly therefrom and cooperating with each other to support a pile of material.

References Cited in the file of this patent

UNITED STATES PATENTS 1,289,529     Overlin _____ Dec. 31, 1918
1,473,894     Weatherby _____ Nov. 13, 1923